(12) United States Patent
Morishita et al.

(10) Patent No.: US 8,342,536 B2
(45) Date of Patent: Jan. 1, 2013

(54) SEALING DEVICE

(75) Inventors: Hirofumi Morishita, Seto (JP); Tetsuya Kohno, Okazaki (JP)

(73) Assignees: Toyota Jidosha Kabushiki Kaisha, Toyota (JP); Koyo Sealing Techno Kabushiki Kaisha, Itano-Gun (JP)

( * ) Notice: Subject to any disclaimer, the term of this patent is extended or adjusted under 35 U.S.C. 154(b) by 567 days.

(21) Appl. No.: 12/458,464

(22) Filed: Jul. 13, 2009

(65) Prior Publication Data
US 2010/0025937 A1 Feb. 4, 2010

(30) Foreign Application Priority Data
Jul. 31, 2008 (JP) ................... 2008-198334

(51) Int. Cl.
*F16J 15/32* (2006.01)
(52) U.S. Cl. .................. 277/562; 277/560; 277/549
(58) Field of Classification Search .................. 277/549, 277/551, 552, 558, 560, 562
See application file for complete search history.

(56) References Cited

U.S. PATENT DOCUMENTS
2007/0158917 A1* 7/2007 Paykin .......................... 277/551
2007/0251380 A1* 11/2007 Kanzaki et al. .................. 92/240

FOREIGN PATENT DOCUMENTS
| JP | A-2001-132850 | 5/2001 |
| JP | A 2005-273782 | 10/2005 |
| JP | A 2006-46550 | 2/2006 |
| JP | A 2006-207820 | 8/2006 |
| JP | A-2008-39071 | 2/2008 |

OTHER PUBLICATIONS

Japanese Office Action dated Apr. 21, 2010 in Japanese Patent Application No. 2008-198334 (with translation).

* cited by examiner

*Primary Examiner* — Gilbert Lee
(74) *Attorney, Agent, or Firm* — Oliff & Berridge, PLC

(57) ABSTRACT

A sealing device that hermetically seals a gap between a first member and a second member that is reciprocally movable with respect to the first member. The sealing device seals liquid supplied into a pressurizing chamber surrounded by the first member and the second member. The sealing device includes a seal member that is attached to the second member. The seal member slides relative to the first member while being in contact with the first member. The seal member includes a base portion and a protruding portion. The protruding portion protrudes from the base portion toward the first member to separate the first member from the base portion. After the liquid is supplied into the pressurizing chamber to fill the pressurizing chamber with the liquid, the protruding portion elastically deforms to bring the base portion into close contact with the first member.

9 Claims, 8 Drawing Sheets

SEALING DEVICE

INCORPORATION BY REFERENCE

The disclosure of Japanese Patent Application No. 2008-198334 filed on Jul. 31, 2008 including the specification, drawings and abstract is incorporated herein by reference in its entirety.

BACKGROUND OF THE INVENTION

1. Field of the Invention

The invention relates to a sealing device and, more particularly, to a sealing device that hermetically seals a gap between a first member and a second member reciprocally movable relative to the first member to seal liquid supplied into a pressurizing chamber surrounded by the first member and the second member.

2. Description of the Related Art

For example, Japanese Patent Application Publication No. 2006-207820 (JP-A-2006-207820), Japanese Patent Application Publication No. 2006-46550 (JP-A-2006-46550) and Japanese Patent Application Publication No. 2005-273782 (JP-A-2005-273782) each describe a technique related to a sealed housing.

JP-A-2006-207820 suggests a technique for achieving high hermeticity and low sliding resistance in such a manner that, in a lip that seals an oil chamber, recesses or protrusions that define recesses are formed on a sliding surface to store hydraulic oil. JP-A-2006-46550 suggests a technique for reducing a sliding resistance in such a manner that a protrusion is provided on a sliding surface to hold hydraulic oil. JP-A-2005-273782 suggests a piston equipped with a lip that holds lubricating oil for applying lubricating oil over the entire contact surface at the time when the piston is assembled to a clutch drum.

In a frictional engagement device, such as a clutch and a brake, installed in a vehicle automatic transmission, hydraulic pressure is applied to a piston to press a plurality of frictional engagement elements to engage the frictional engagement elements, thus selectively activating respective gears. When a specific shift of the automatic transmission is carried out, two different frictional engagement devices may respectively engage and release at the same time (so-called clutch-to-clutch shift).

In the clutch-to-clutch shift, if the progress of engagement of the engaging-side frictional engagement device delays from the progress of release of the releasing-side frictional engagement device, there occurs a situation that both the releasing-side and engaging-side frictional engagement devices are not sufficiently engaged. As a result, an engine rotational speed increases, and a phenomenon, so-called "engine racing", occurs. This makes it difficult to achieve a desirable shift feel. For example, when air is trapped into an oil chamber by which the piston of the frictional engagement device is controlled for movement, air is compressed to delay an increase in hydraulic pressure when the hydraulic pressure in the oil chamber is increased. This may cause engine racing.

Even when the engine racing occurs because of a delay of rising of the hydraulic pressure in the oil chamber, a command value may be fed back through learning control. Specifically, delaying hydraulic control over the releasing-side frictional engagement device or advancing hydraulic control over the engaging-side frictional engagement device is, for example, carried out as the learning control. In this manner, it is possible to suppress occurrence of engine racing from the next shift.

However, the amount of air trapped in the oil chamber is not constant, and is variable. As the amount of air in the oil chamber increases, rising of hydraulic pressure delays against a command value to cause engine racing. In addition, as air suddenly comes out of the oil chamber and then the amount of air trapped in the oil chamber reduces, the progress of engagement of the engaging-side frictional engagement device advances relative to the progress of release of the releasing-side frictional engagement device. As a result, there occurs a state (tie-up) in which a plurality of frictional engagement devices for different gears are engaged at the same time. This causes a shift shock that is dependent on a difference in rotational speed between frictional engagement elements.

It is difficult to recognize when air is trapped in the oil chamber. Trapped air usually accumulates in the oil chamber, but the air may suddenly come out of the oil chamber. Thus, it is difficult to predict the amount of air in the oil chamber. When a command value for learning control is set in a state where air is trapped in the oil chamber, there is a problem that controllability deteriorates because of variations in the amount of air trapped in the oil chamber, and, as a result, engine racing or a shift shock occurs. However, the above related techniques have not suggested a solution to the above problem.

SUMMARY OF THE INVENTION

The invention provides a sealing device that hermetically seals a gap between a first member and a second member that is reciprocally movable with respect to the first member to seal liquid supplied into a pressurizing chamber surrounded by the first member and the second member, and that is able to suppress variations in the amount of gas trapped in the pressurizing chamber.

A first aspect of the invention relates to a sealing device. The sealing device hermetically seals a gap between a first member and a second member that is reciprocally movable with respect to the first member to seal liquid supplied into a pressurizing chamber surrounded by the first member and the second member. The sealing device includes a sliding portion that is attached to the second member and that slides relative to the first member while being in contact with the first member. The sliding portion includes a base portion and a protruding portion. The protruding portion protrudes from the base portion toward the first member. The protruding portion separates the first member from the base portion, and elastically deforms to bring the base portion into close contact with the first member after the liquid is supplied into the pressurizing chamber to fill the pressurizing chamber with the liquid.

The first member may be a hollow cylinder, the second member may be a piston that reciprocally moves in the cylinder, the pressurizing chamber may be an oil chamber that is defined by partitioning an internal space of the cylinder by the piston, hydraulic oil for moving the piston being supplied into the oil chamber, and the sealing device may hermetically seal a gap between the cylinder and the piston to seal the hydraulic oil in the oil chamber.

A protrusion height by which the protruding portion protrudes from the base portion may be 0.2 mm in a state where no external force is applied to the protruding portion.

The sliding portion may have an annular shape, and a plurality of the protruding portions may be formed at equiangular positions in a circumferential direction of the sliding portion. The sliding portion may have an annular shape, and the protruding portion may include a plurality of protrusions that are aligned in a circumferential direction of the sliding portion.

With the sealing device according to the aspect of the invention, even when gas is trapped in the pressurizing chamber, the gas comes out of the pressure chamber via a gap formed by the protruding portion between the first member and the base portion while liquid is being supplied into the pressurizing chamber. Thus, when the pressurizing chamber is filled with the liquid, it is possible to maintain a state where no gas is trapped in the pressurizing chamber. In addition, after the pressurizing chamber is filled with the liquid, the base portion is in close contact with the first member to hermetically seal the pressurizing chamber. Thus, it is possible to ensure sealing performance of the pressurizing chamber. As a result, it is possible to reduce gas being trapped in the pressurizing chamber, and it is possible to suppress variations in the amount of gas trapped in the pressurizing chamber to thereby make it possible to improve controllability.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
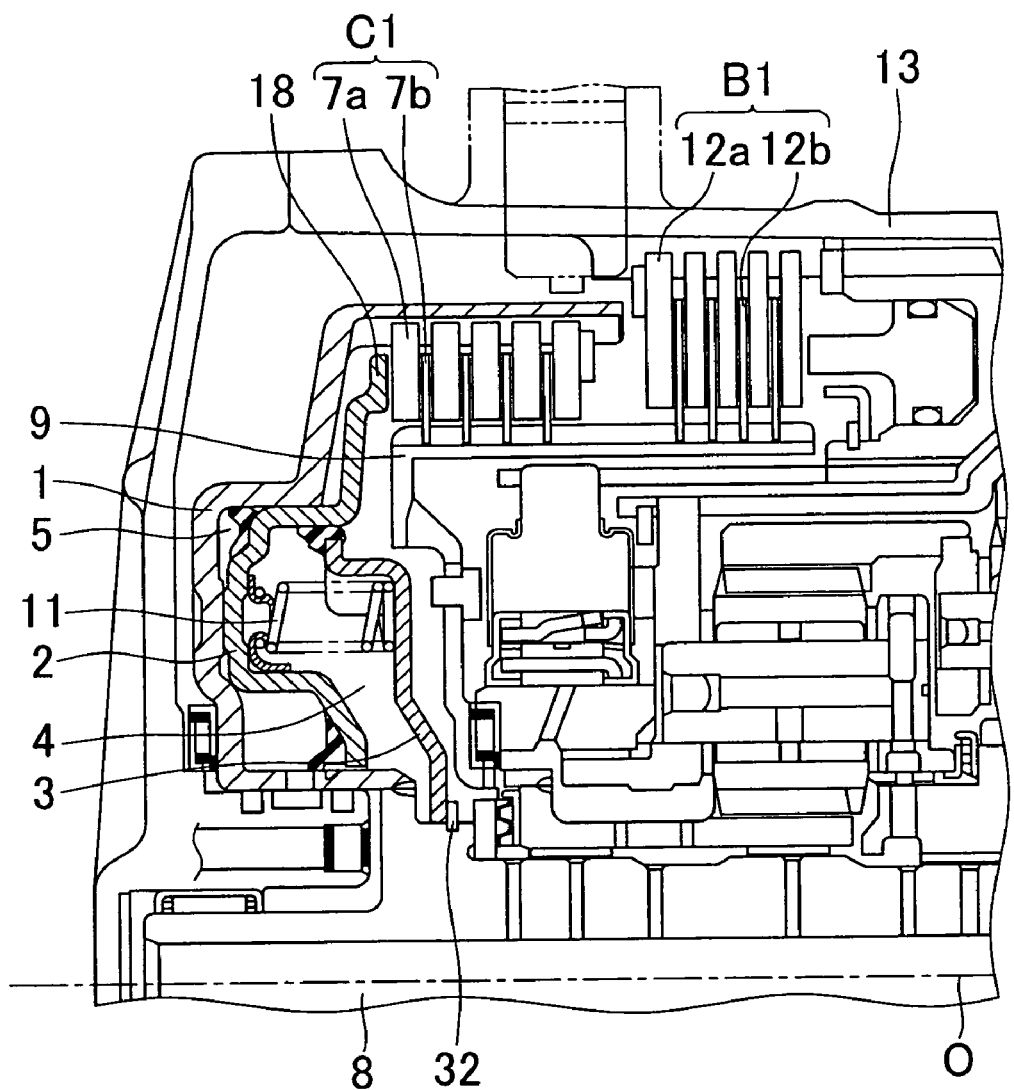
FIG. 1 is a partial schematic view that shows the configuration of an automatic transmission equipped with a sealing device according to an embodiment of the invention.

Hereinafter, an embodiment of the invention will be described with reference to the accompanying drawings. Note that, in the drawings, like reference numerals denote like or corresponding components, and the description thereof will not be repeated.

Note that, when the embodiment described below refers to the number, amount, or the like, of components, the number, or the like, of components is illustrative unless otherwise specified, and the scope of the invention is not necessarily limited to that number, amount, or the like, of components.

FIG. 1 is a partial schematic view that shows the configuration of an automatic transmission equipped with a sealing device according to the embodiment of the invention. As shown in FIG. 1, the automatic transmission includes an input shaft 8, which may serve as a rotary shaft, accommodated in a case 13. A cylinder 1 is provided at one end side of the input shaft 8. The cylinder 1 may serve as a first member. In addition, a piston 2 is provided so as to form an oil chamber 5 between the piston and the cylinder 1. The piston 2 may serve as a second member. The oil chamber 5 may serve as a pressurizing chamber. The piston 2 is reciprocally movable in the cylinder 1 in the direction of an axis O, which is an imaginary rotation center of the input shaft 8. The piston 2 faces the cylinder 1 around the input shaft 8.

In addition, a balance piston 3 is provided around the input shaft 8 so as to face the piston 2. The balance piston 3 is fixed to the input shaft 8. The balance piston 3 is provided on a side opposite to an oil chamber 5 with respect to the piston 2 so as to form a centrifugal hydraulic pressure balance chamber 4 between the balance piston 3 and the piston 2. A plurality of return springs 11 for urging the piston 2 toward the cylinder 1 are provided at a plurality of positions in the centrifugal hydraulic pressure balance chamber 4 so as to surround the input shaft 8. The return springs 11 may serve as elastic members. One end of each return spring 11 is in contact with the piston 2, and the other end thereof is in contact with the balance piston 3.

The cylinder 1, the piston 2 and the balance piston 3 each have an annular shape. The cylinder 1, the piston 2 and the balance piston 3 are arranged so that the center of each of the cylinder 1, the piston 2 and the balance piston 3 are aligned with respect to the axis O of the input shaft 8. That is, the cylinder 1, the piston 2 and the balance piston 3 each have an annular shape having the common axis O with the input shaft 8.

Figure 2:
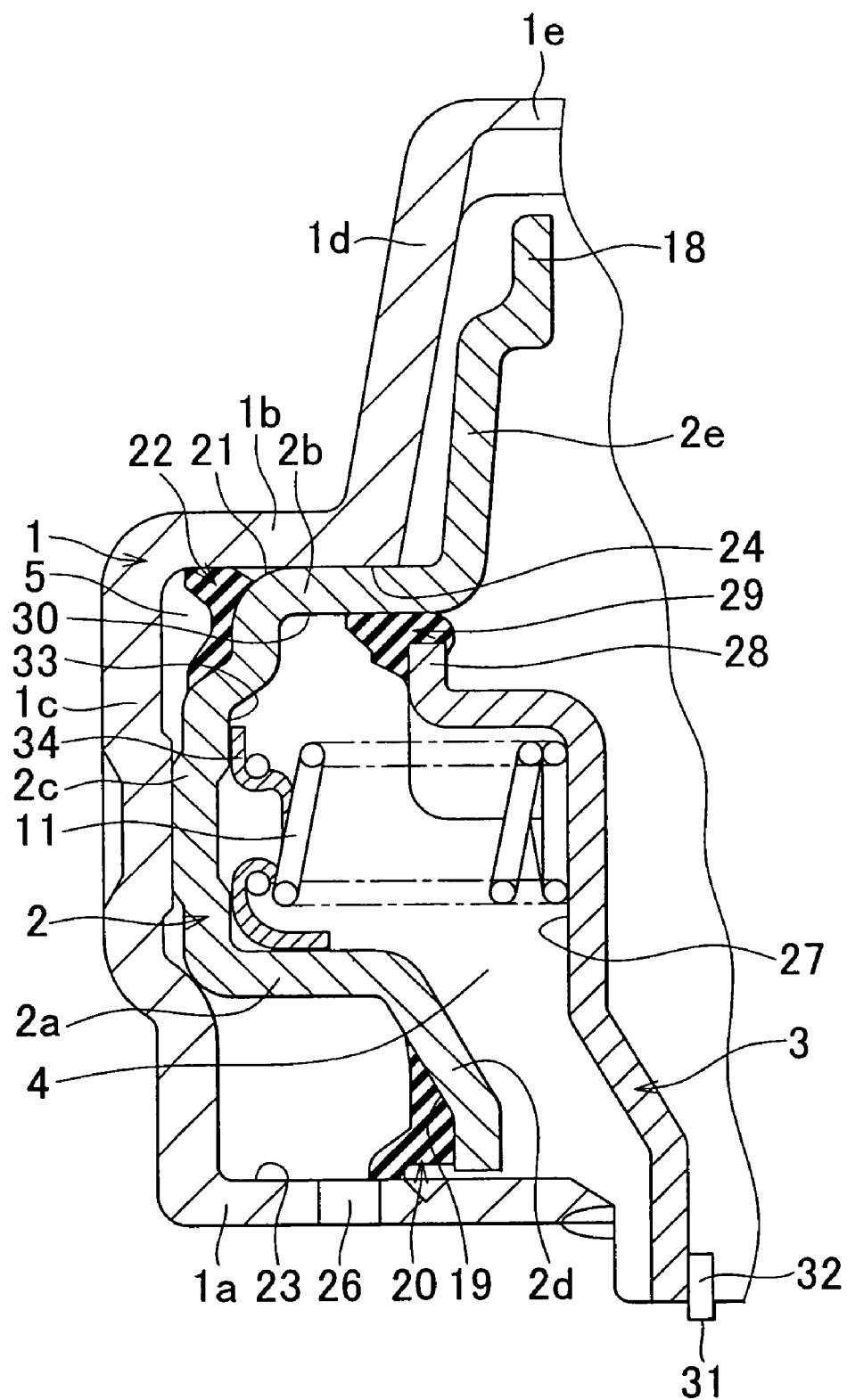
FIG. 2 is an enlarged schematic cross-sectional view that shows a portion around a piston of the automatic transmission.

FIG. 2 is an enlarged schematic cross-sectional view that shows a portion around the piston of the automatic transmission. As shown in FIG. 2, the cylinder 1 has a closed-end hollow housing shape. The cylinder 1 includes a cylindrical inner cylinder 1a, a cylindrical outer cylinder 1b, and a substantially annular end wall 1c. The center of the inner cylinder 1a is aligned with respect to the axis O. The center of the outer cylinder 1b is aligned with respect to the axis O. The outer cylinder 1b is located radially outward of the input shaft 8 with respect to the inner cylinder 1a. The end wall 1c connects one end (end portion at the left side in FIG. 2) of the inner cylinder 1a with one end (end portion at the left side in FIG. 2) of the outer cylinder 1b. The end wall 1c forms a bottom portion of the housing-shaped cylinder 1. The inner cylinder 1a and the outer cylinder 1b respectively form peripheral wall portions of the cylinder 1. The cylinder 1 further includes a taper portion 1d and a cylindrical cylinder portion 1e. The taper portion 1d extends radially outward as it distances from the outer cylinder 1b along the axis O. The center of the cylinder portion 1e is aligned with respect to the axis O. One end of the cylinder portion 1e is connected to the taper portion 1d.

The piston 2 includes a cylindrical inner cylinder 2a, a cylindrical outer cylinder 2b and a substantially annular end wall 2c. The center of the inner cylinder 2a is aligned with respect to the axis O. The center of the outer cylinder 2b is aligned with respect to the axis O. The outer cylinder 2b is located radially outward of the input shaft 8 with respect to the inner cylinder 2a. The end wall 2c connects one end (end portion at the left side in FIG. 2) of the inner cylinder 2a with one end (end portion at the left side in FIG. 2) of the outer cylinder 2b. The end wall 2c protrudes away from the balance piston 3. An outer peripheral surface of the outer cylinder 2b is in slidable contact with an inner peripheral surface of the outer cylinder 1b of the cylinder 1. The piston 2 further includes a taper portion 2d, a taper portion 2e and a pressing portion 18. The taper portion 2d extends radially inward as it distances from the inner cylinder 2a along the axis O. The taper portion 2e extends radially outward as it distances from the outer cylinder 2b along the axis O. The pressing portion 18 extends radially outward from the taper portion 2e. The pressing portion 18 contacts an extended rotary clutch C1 (see FIG. 1).

The piston 2 is inserted in the cylinder 1 so that the piston 2 is reciprocally movable in the direction along the axis O. A seal member 20 is provided on an inner peripheral surface 19 of the taper portion 2d of the piston 2. The seal member 20 may serve as a sliding portion. The seal member 20 slides relative to an outer peripheral surface 23 of the inner cylinder 1a of the cylinder 1. In addition, a seal member 22 is provided on the outer cylinder 2b of the piston 2 at a portion adjacent to the end wall 2c of an outer peripheral surface 21 of the outer cylinder 2b. The seal member 22 may serve as a sliding portion. The seal member 22 slides relative to an inner peripheral surface 24 of the outer cylinder 1b of the cylinder 1. The seal members 20 and 22 each have an annular shape having a center aligned with respect to the axis O. The seal members 20 and 22 are made of an elastic material, such as rubber. The seal member 20 is in contact with the outer peripheral surface 23 of the inner cylinder 1a. The seal member 22 is in contact with the inner peripheral surface 24 of the outer cylinder 1b. The seal members 20 and 22 are in contact with the cylinder 1 and slide relative to the cylinder 1, so the seal members 20 and 22 may be made of a material having high wear resistance in order to suppress wear as much as possible.

An inner space of the hollow cylinder 1 is partitioned by the piston 2 to define an oil chamber 5. The oil chamber 5 is surrounded by the cylinder 1, the piston 2 and the seal members 20 and 22. The seal members 20 and 22 fitted to the piston 2 are in close contact with the cylinder 1. This hermetically seals gaps between the cylinder 1 and the piston 2 that is reciprocally movable with respect to the cylinder 1.

A communication hole 26 is perforated in the inner cylinder 1a of the cylinder 1. The communication hole 26 provides fluid communication between the oil chamber 5 and an outer side of the radially inward portion of the cylinder 1. Through the communication hole 26, liquid hydraulic oil pressurized by a pressure device (not shown) is allowed to flow into the oil chamber 5. It is only necessary that the communication hole 26 is able to provide fluid communication between the inside and outside of the oil chamber 5. Therefore, the configuration is not limited to the one that the communication hole 26 is formed in the cylinder 1. Instead, for example, a communication hole may be formed in the piston 2. In addition, a plurality of communication holes may be formed.

The balance piston 3 includes a flat portion 27 on a surface facing the piston 2. The flat portion 27 is substantially parallel to the end wall 2c of the piston 2. A seal member 29 is provided at an outer periphery 28 of the balance piston 3. The seal member 29 is in slidable contact with an inner peripheral surface 30 of the outer cylinder 2b of the piston 2. Movement of the balance piston 3 in one direction (rightward direction in FIG. 2) along the axis O is restricted in such a manner that the balance piston 3 contacts a snap ring 32 fitted in a groove 31.

Retaining members 34 are attached to a facing surface 33, facing the balance piston 3, of the end wall 2c of the piston 2. The return springs 11, such as coil springs, are respectively attached to the retaining members 34 in parallel to the axis O. The return springs 11 constantly press the piston 2 and the balance piston 3 in the direction of the axis O. The centrifugal hydraulic pressure balance chamber 4 is defined by partitioning the inside of the cylinder 1 so that the centrifugal hydraulic pressure balance chamber 4 is surrounded by the piston 2, the balance piston 3 and the inner cylinder 1a of the cylinder 1. The oil chamber 5 and the centrifugal hydraulic pressure balance chamber 4 are aligned in the direction of the axis O.

Referring back to FIG. 1, a plurality of plates 7a are provided on the inner surface of the cylinder portion 1e, and friction members 7b are provided for a hub 9. The friction members 7b engage with the plates 7a. The plates 7a and the friction members 7b constitute the rotary clutch C1. In addition, a plurality of friction members 12b are provided for the hub 9. A plurality of plates 12a are provided for the case 13. The plates 12a and the friction members 12b constitute a brake B1.

In the automatic transmission, as pressurized hydraulic oil is introduced into the oil chamber 5 via the communication hole 26, the piston 2 moves toward the balance piston 3 against the urging force of the return springs 11. At this time, the pressing portion 18 of the piston 2 contacts the plate 7a coupled to the cylinder 1 to move the plates 7a and the friction members 7b in the direction of the axis O. When the cylinder 1 is coupled to the hub 9, engagement of the brake B1 is gradually released, while oil is introduced into the oil chamber 5. By so doing, the piston 2 moves to cause the rotary clutch C1 to be engaged. At this time, oil in the centrifugal hydraulic pressure balance chamber 4 is drained to the input shaft 8 side.

Next, the seal members will be specifically described. Here, the seal member 22, which is provided for the outer cylinder 2b of the piston 2 and which slides relative to the inner peripheral surface of the outer cylinder 1b of the cylinder 1, will be described as an example. However, the seal members 20 and 29 each may also have a similar configuration to that of the seal member 22.

Figure 3:
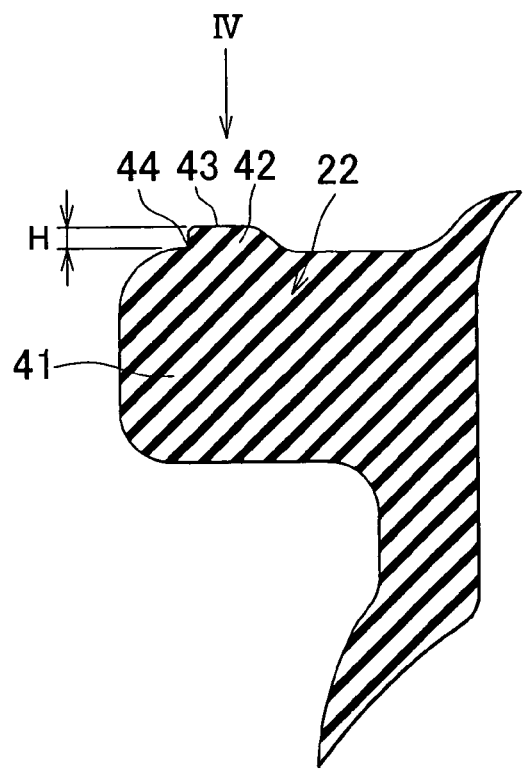
FIG. 3 is an enlarged schematic cross-sectional view that shows a seal member.

FIG. 3 is an enlarged schematic cross-sectional view that shows the seal member. As shown in FIG. 3, the seal member 22 includes a base portion 41 and a protruding portion 42. The protruding portion 42 is formed on the surface of the base portion 41, and protrudes from the base portion 41 by a distance H. The protruding portion 42 has top portions 43 and bottom portions 44. The top portions 43 are maximally distanced from the base portion 41. The bottom portions 44 are portions supported by the base portion 41. Each top portion 43 is distanced from the bottom portion 44 by the distance H. The distance H is a protrusion height by which the protruding portion 42 protrudes from the base portion 41.

Figure 4:
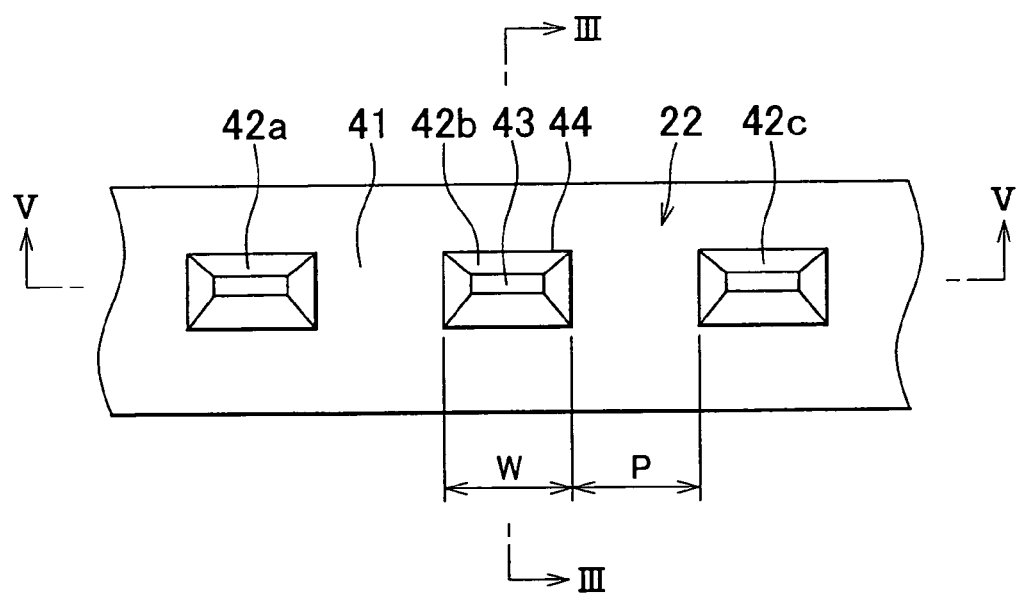
FIG. 4 is a schematic plan view of the seal member as viewed in an arrow IV direction in FIG. 3.

FIG. 4 is a schematic plan view of the seal member as viewed in an arrow IV direction in FIG. 3. Note that FIG. 3 is a cross-sectional view of the seal member, taken along the line III-III in FIG. 4. That is, the vertical direction in FIG. 4 indicates the direction along the axis O (see FIG. 1), and the horizontal direction in FIG. 4 indicates a circumferential direction of the annular seal member 22 perpendicular to the direction of the axis O.

As shown in FIG. 4, the seal member 22 has the protruding portion 42 that protrudes from the base portion 41, and the protruding portion 42 includes a plurality of protrusions 42a, 42b and 42c aligned in the circumferential direction of the annular seal member 22. Each of the protrusions 42a, 42b and 42c has a rectangular shape in plan view, and is connected to the base portion 41 at its bottom portion 44. Each of the protrusions 42a, 42b and 42c has the top portion 43 having a rectangular shape in plan view. Each top portion 43 has a predetermined area so that the protruding portion 42 is able to be in area contact with another member at the top portions 43. Each of the protrusions 42a, 42b and 42c has a width W in the circumferential direction of the seal member 22. The protrusions 42a, 42b and 42c are arranged at an interval of a pitch P between the adjacent protrusions (that is, the interval between the protrusion 42a and the protrusion 42b or the interval between the protrusion 42b and the protrusion 42c).

Figure 5:
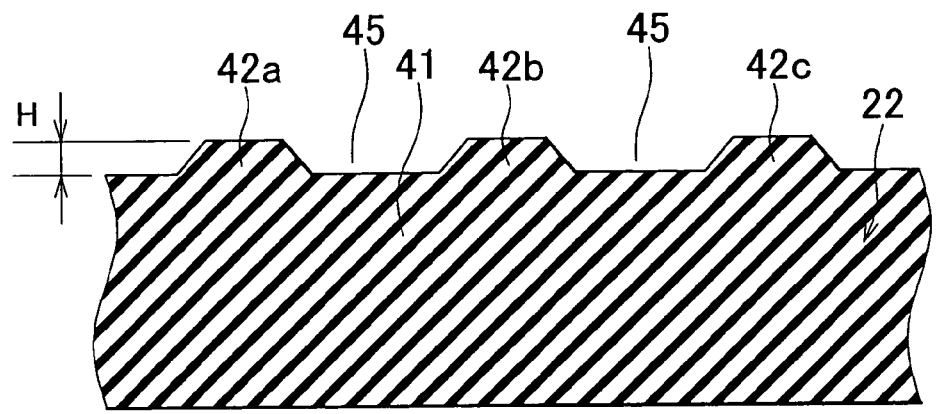
FIG. 5 is a schematic cross-sectional view of the seal member, taken along the line V-V in FIG. 4.

FIG. 5 is a schematic cross-sectional view of the seal member, taken along the line V-V in FIG. 4. As shown in FIG. 5, the seal member 22 has the protrusions 42a, 42b and 42c that protrude upward in the drawing, so a gap 45 is formed between the adjacent protrusions (that is, between the protrusions 42a and 42b and between the protrusions 42b and 42c).

Next, the operations of the sealing device according to the present embodiment will be described step by step with reference to FIG. 6 to FIG. 10. In FIG. 6 to FIG. 10, in order to make it easy to understand the operations of the sealing device, the shapes of the cylinder 1, the piston 2, the oil chamber 5 surrounded by and the cylinder 1 and the piston 2, and the seal member 22 that hermetically seals a gap between the cylinder 1 and the piston 2 are simply shown.

Figure 6:
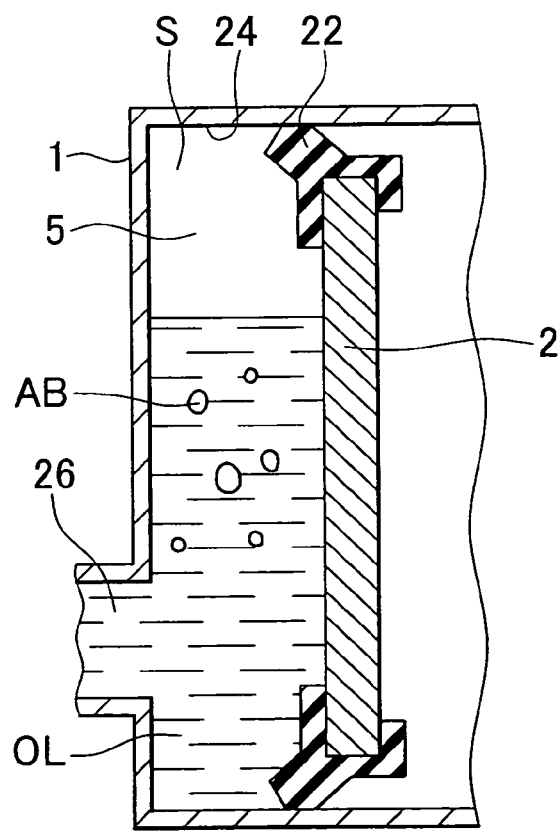
FIG. 6 is a schematic view that shows a state before a pressurizing chamber is pressurized.

FIG. 6 is a schematic view that shows a state before the pressurizing chamber is pressurized. FIG. 6 shows a state where no force is applied from hydraulic oil OL in a direction to move the piston 2 in the direction of the axis O, and the plates 7a and friction members 7b of the rotary clutch C1 shown in FIG. 1 are not engaged (referred to as piston OFF state). As shown in FIG. 6, the inner space of the cylinder 1 is partitioned by the piston 2 into left and right spaces in the drawing, and the left space forms the oil chamber 5. Liquid hydraulic oil OL is supplied into the oil chamber 5 surrounded by the cylinder 1 and the piston 2 to cause the piston 2 to reciprocally move with respect to the cylinder 1.

Air bubbles AB are trapped in the hydraulic oil OL. The air bubbles AB are, for example, trapped in the hydraulic oil OL because, when oil stored in an oil pan is drawn by an oil pump, air is drawn together due to an inclination of an oil surface in the oil pan to become fine air bubbles in the oil pump and then the fine air bubbles are trapped into the oil. The air bubbles AB trapped in the hydraulic oil OL supplied to the oil chamber 5 go up in the oil chamber 5 and accumulate at an upper region of the oil chamber 5, thus forming a space S at the upper region of the oil chamber 5.

Figure 7:
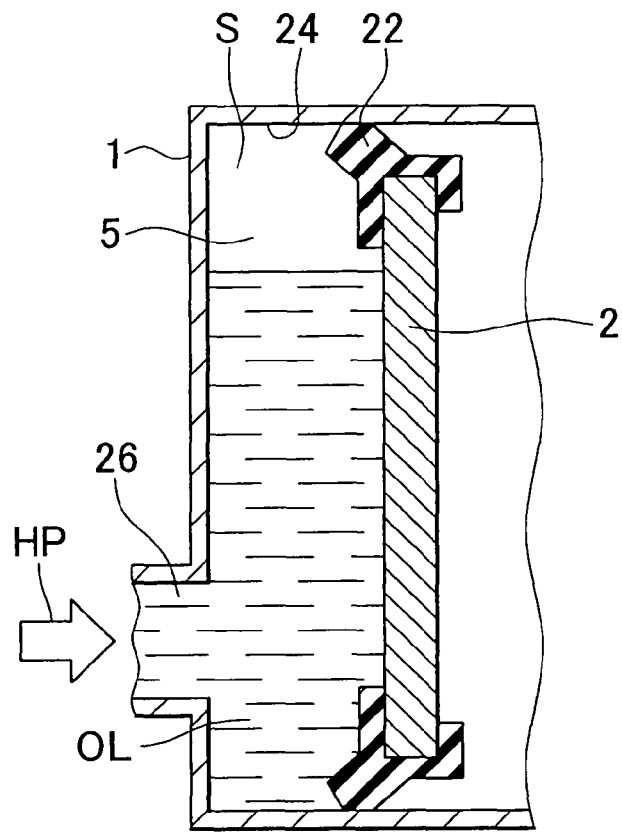
FIG. 7 is a schematic view that shows a state where liquid is supplied into the pressurizing chamber.

FIG. 7 is a schematic view that shows a state where liquid is supplied to the pressurizing chamber. As indicated by the arrow HP in FIG. 7, the hydraulic oil OL is supplied into the oil chamber 5 via the communication hole 26. When comparing FIG. 6 and FIG. 7, the amount of hydraulic oil OL in the oil chamber 5 is increased in the state shown in FIG. 7 as compared with the state shown in FIG. 6, so the liquid surface level of the hydraulic oil OL is higher in FIG. 7 than in FIG. 6. As a result, the volume of the space S at the upper region of the oil chamber 5 is further reduced in the state shown in FIG. 7. At this time, an increase in the amount of the hydraulic oil OL in the oil chamber 5 is applied to reduce the volume of the space S. This reduces an increase in hydraulic pressure of the hydraulic oil OL, and a pressure applied by the hydraulic oil OL to the piston 2 in the direction of the axis O is low.

Figure 8:
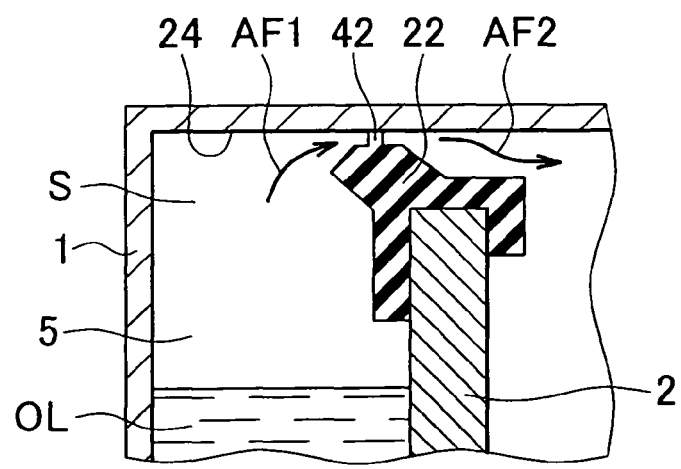
FIG. 8 is an enlarged schematic view that shows a portion around the seal member shown in FIG. 7.

FIG. 8 is an enlarged schematic view that shows a portion around the seal member shown in FIG. 7. As described with reference to FIG. 3, FIG. 4 and FIG. 5, the seal member 22 has the protruding portion 42, and the protruding portion 42 has the plurality of protrusions 42a, 42b and 42c that are formed and aligned in the circumferential direction of the annular shape. The gaps 45 are formed between the plurality of protrusions 42a, 42b and 42c. When the protruding portion 42 protrudes from the base portion 41 toward the cylinder 1 to separate the cylinder 1 from the base portion 41, the gaps 45 placed between the adjacent protrusions 42a, 42b and 42c are formed between the cylinder 1 and the base portion 41. While an increase in hydraulic pressure of the hydraulic oil OL is small, a stress applied from the hydraulic pressure OL to the seal member 22 is small. Thus, the protruding portion 42 does not deform to be squashed. The protruding portion 42 ensures the gaps 45 that provide fluid communication between the inside and outside of the oil chamber 5.

Because of the gaps 45, as the space S reduces, air flows from the inside of the oil chamber 5 via the gaps 45 to the outside of the oil chamber 5 as shown by the arrows AF1 and AF2 in FIG. 8. In other words, the inside and outside of the oil chamber 5 are in fluid communication via the gaps 45, so air accumulated in the space S is pushed toward the outside of the oil chamber 5 and discharged through the gaps 45 as the hydraulic oil OL is supplied into the oil chamber 5. Because air comes out through the gaps 45, the space S, which is an accumulation of gas formed inside the oil chamber 5 so that air bubbles AB trapped in the hydraulic oil OL accumulate, reduces as the oil surface level of the hydraulic oil OL rises.

Here, when the protrusion height by which the protruding portion 42 protrudes from the base portion 41 (protrusion height H shown in FIG. 3 and FIG. 5) is excessively small, it is difficult to ensure the gaps 45 between the cylinder 1 and the base portion 41. On the other hand, in a state where the protrusion height H of the protruding portion 42 is excessively large, when the base portion 41 is brought into close contact with the cylinder 1, there occurs an imbalance in pressure between a position at which protruding portion 42 is formed in the circumferential direction of the annular seal member 22 and a position at which no protruding portion 42 is formed (for example, a position at which the gaps 45 are formed between the protruding portions 42). That is, reaction force that is applied to the position at which the protruding portion 42 is formed and that acts from the cylinder 1 to the seal member 22 is relatively large. On the other hand, reaction force that is applied to the position at which no protruding portion 42 is formed and that acts from the cylinder 1 to the seal member 22 is relatively small.

For this reason, the protrusion height H of the protruding portion 42 needs to be designed so that the gaps 45 may be ensured and an imbalance in reaction force that acts from the cylinder 1 to the seal member 22 is suppressed and is made uniform. To satisfy the above conditions, the protrusion height H may be 0.2 mm in a state where no external force is applied to the protruding portion 42. Note that the state where no external force is applied to the protruding portion 42 means a state where the seal member 22 is attached to the piston 2, but the piston 2 to which the seal member 22 is attached is not yet assembled into the cylinder 1, and the protruding portion 42 is not in contact with the cylinder 1. That is, in a state where the protruding portion 42 is in contact with the cylinder 1, the protrusion height H is smaller than 0.2 mm.

In addition, if the number of protrusions included in the protruding portion 42 and protruding from the base portion 41 toward the cylinder 1 is one, stress applied from the cylinder 1 concentrates on that protrusion to cause the protrusion to easily deform. Therefore, it is difficult to ensure the gap 45. Then, as shown in FIG. 4 and FIG. 5, the protruding portion 42 may be formed to include the plurality of protrusions 42a, 42b and 42c that are aligned in the circumferential direction of the seal member 22. By so doing, it is possible to reliably ensure the gaps 45 for allowing air to flow. Note that the number of protrusions included in one protruding portion 42 is not limited to three as shown in FIG. 4 and FIG. 5; the protruding portion 42 that includes a selected number of protrusions may be formed in the seal member 22.

In the case where the protruding portion 42 that includes a plurality of protrusions is formed, when the interval between the protrusions is excessively large, the protrusions easily deform. Thus, it is difficult to ensure the gap 45. On the other hand, when the interval between the protrusions is excessively small, there is a possibility that the gap 45 between the protrusions may remain after the protrusions has deformed by reaction force applied from the cylinder 1 to the seal member 22, and hydraulic oil OL may leak to the outside from the pressurized oil chamber 5 through the gap 45, thus deteriorating the sealing performance. For the above reason, referring to FIG. 4, the protrusions 42a, 42b and 42c may be formed so that the width W of each protrusion is equal to the pitch P, which is the interval between the protrusions, (that is, the relational expression W=P is satisfied). By so doing, it is possible to reliably ensure the gaps 45 for allowing air to flow, and it is possible to ensure the sealing performance of the seal member 22.

Figure 9:
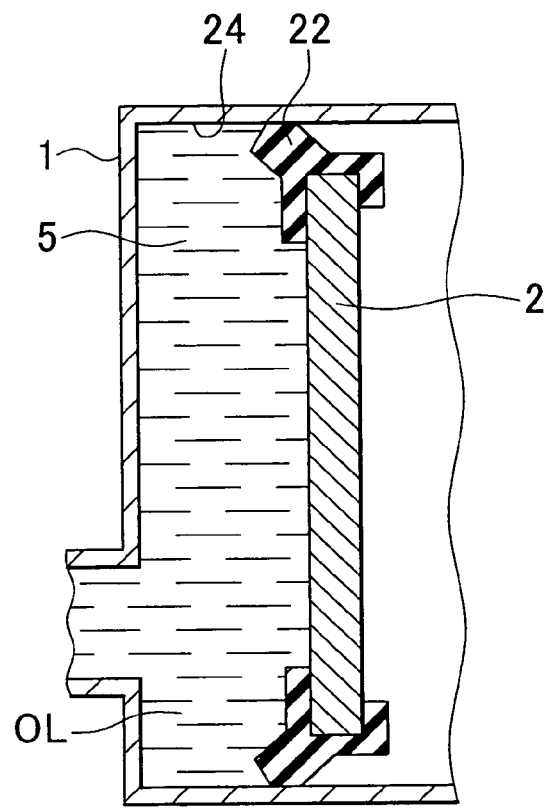
FIG. 9 is a schematic view that shows a state where the oil chamber is filled with hydraulic oil.
Figure 10:
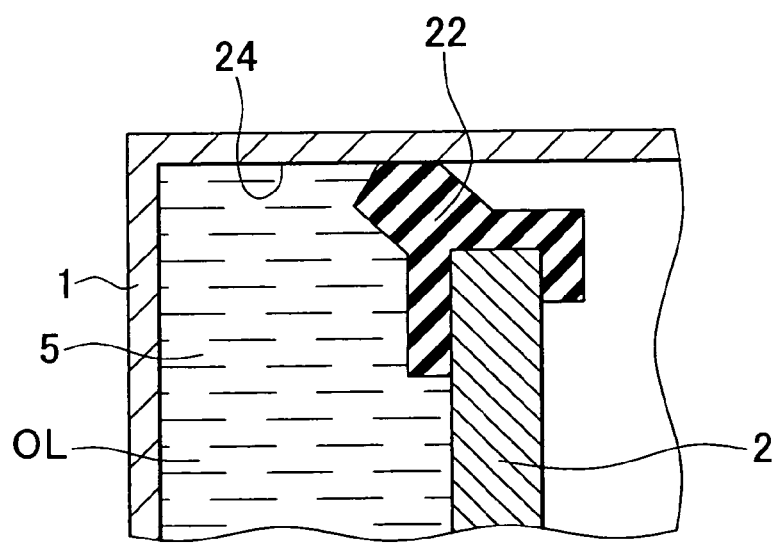
FIG. 10 is an enlarged schematic view that shows a portion around the seal member shown in FIG. 9.

FIG. 9 is a schematic view that shows a state where the oil chamber is filled with hydraulic oil. FIG. 10 is an enlarged schematic view that shows a portion around the seal member shown in FIG. 9. FIG. 9 shows a state where force is applied from the hydraulic oil OL in the direction to move the piston 2 in the direction of the axis O, and the plates 7a and friction members 7b of the rotary clutch C1 shown in FIG. 1 are engaged (referred to as piston ON state). In FIG. 6 to FIG. 8, the space S in which air accumulates is formed at the upper region of the oil chamber 5. However, air has flown out to the outside of the oil chamber 5 via the gaps 45 formed by the protruding portion 42. As a result, in FIG. 9 and FIG. 10, the entire air in the oil chamber 5 has been discharged, and the inside of the oil chamber 5 is filled with hydraulic oil OL.

At this time, the hydraulic oil OL inside the oil chamber 5 is pressurized to a hydraulic pressure by which the piston 2 can be pressed to move. For example, the hydraulic pressure of the hydraulic oil OL is increased to about 1 to 2 MPa. Therefore, a hydraulic pressure at which the hydraulic oil OL presses the seal member 22 is also increased. By the hydraulic pressure applied from the hydraulic oil OL to the seal member 22, the protruding portion 42 cannot keep the shapes of the protrusions. As a result, the protruding portion 42 elastically deforms to be squashed. As the protrusions of the protruding portion 42 are squashed, no gap 45 is formed between the protrusions.

That is, when the hydraulic pressure of the hydraulic oil OL increases to a predetermined value, the protruding portion 42 elastically deforms. Thus, no gap is formed between the cylinder 1 and the base portion 41 of the seal member 22, and the base portion 41 is in close contact with the cylinder 1. Because the seal member 22 made of an elastic material is in close contact with the cylinder 1 without any gap, the inside of the oil chamber 5 is a hermetically sealed space, and the hydraulic oil OL is sealed in the oil chamber 5. For this reason, after the oil chamber 5 is filled with the hydraulic oil OL, sealing performance between the cylinder 1 and the piston 2 is ensured.

Figure 11:
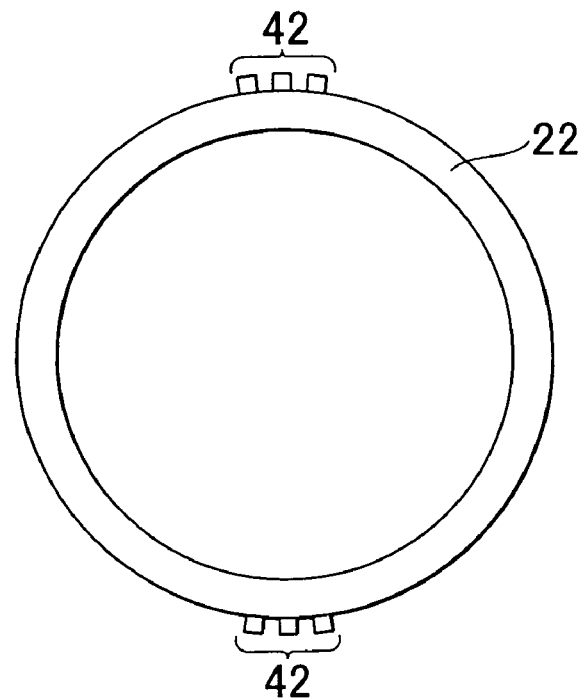
FIG. 11 is a schematic view that shows an example of positions at which protruding portions are formed in the seal member.
Figure 12:
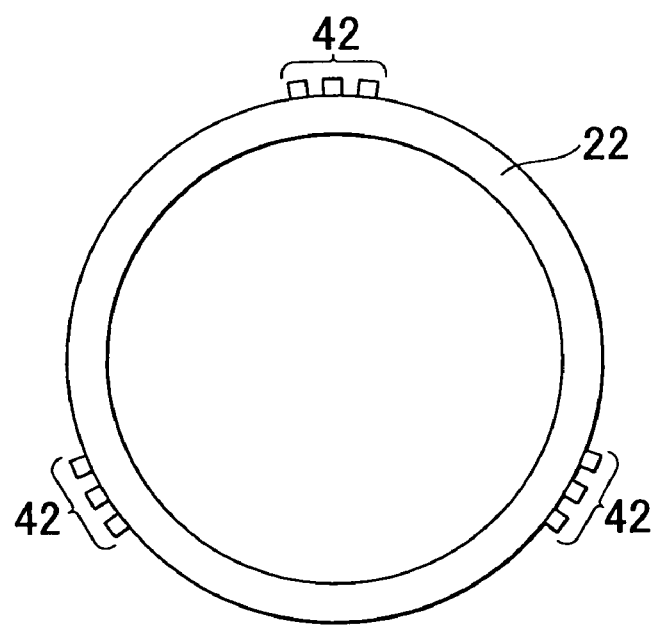
FIG. 12 is a schematic view that shows another example of positions at which protruding portions are formed in the seal member.
Figure 13:
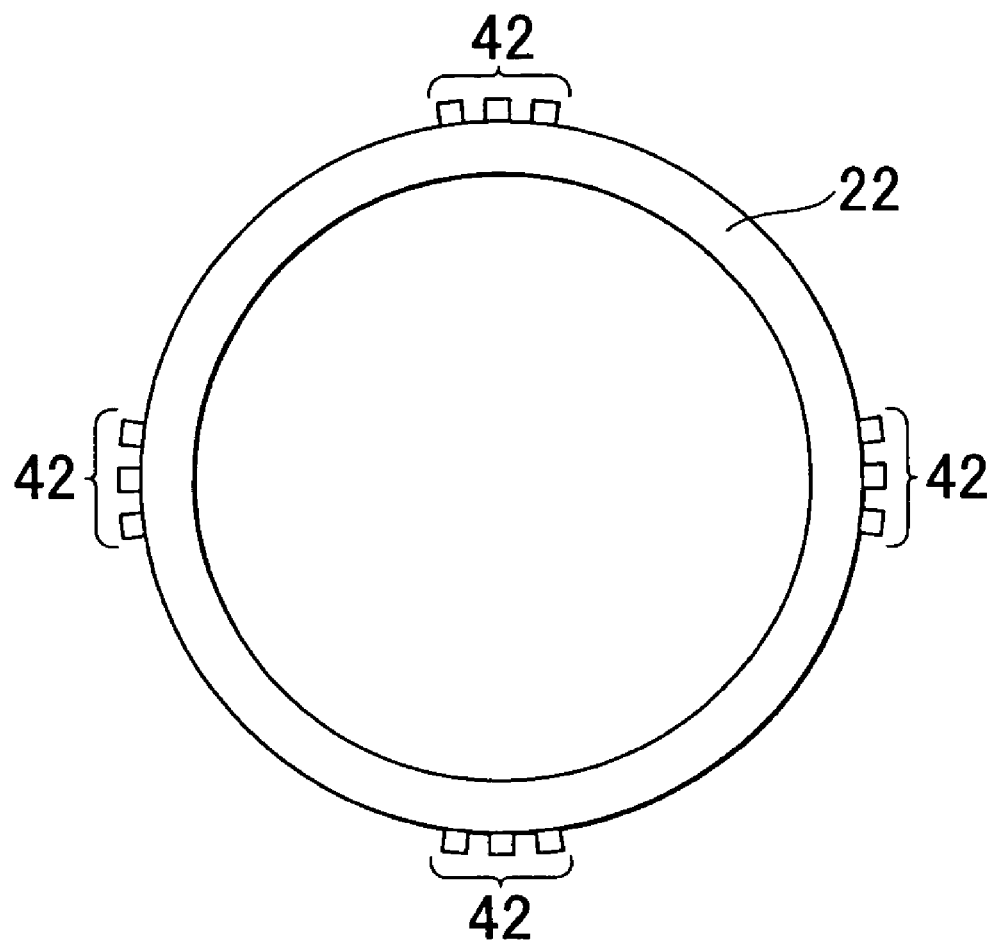
FIG. 13 is a schematic view that shows further another example of positions at which protruding portions are formed in the seal member.

Next, an example of positions of the protruding portions formed in the seal member will be described. FIG. 11 is a schematic view that shows an example of positions at which protruding portions are formed in the seal member. FIG. 12 is a schematic view that shows another example of positions at which protruding portions are formed in the seal member. FIG. 13 is a schematic view that shows further another example of positions at which protruding portions are formed in the seal member.

The seal member 22 has an annular shape. In FIG. 11 to FIG. 13, the shape of the annular seal member 22 is simply shown in an annular shape. In FIG. 11, two protruding portions 42 are formed so as to protrude from the outer periphery of the annular seal member 22. The two protruding portions 42 shown in FIG. 11 are formed so as to protrude toward the upper side and lower side in the drawing. The two protruding portions 42 are formed at the positions that are rotated by 180 degrees about the center of the annular shape of the seal member 22.

In FIG. 12, three protruding portions 42 are formed so as to protrude from the outer periphery of the annular seal member 22. The three protruding portions 42 shown in FIG. 12 are formed so as to protrude toward the upper side, lower right side, and lower left side in the drawing. The three protruding portions 42 are formed at the positions that are rotated by 120 degrees about the center of the annular shape of the seal member 22.

In FIG. 13, four protruding portions 42 are formed so as to protrude from the outer periphery of the annular seal member 22. The four protruding portions 42 shown in FIG. 13 are formed so as to protrude toward the upper side, lower side, right side and left side in the drawing. The four protruding portions 42 are formed at the positions that are rotated by 90 degrees about the center of the annular shape of the seal member 22.

That is, in the examples shown in FIG. 11 to FIG. 13, the plurality of protruding portions 42 are formed so as to protrude from the outer periphery of the annular seal member 22, and the plurality of protruding portions 42 are formed so as to be arranged at equiangular positions in the circumferential direction of the seal member 22. That is, the protruding portions 42 are formed so that, when the seal member 22 is rotated by a predetermined angle smaller than 360 degrees, arrangements of the protruding portions 42 before and after the rotation coincide with each other.

If the protruding portion 42 is formed only at a single position on the outer periphery of the seal member 22, the seal member 22 is slightly decentered. This may decrease the sealing performance of the seal member 22. In addition, when a plurality of protruding portions 42 are formed at non-equiangular positions in the circumferential direction as well, there is a possibility that the seal member 22 may also be decentered. Thus, a plurality of protruding portions 42 may be formed at equiangular positions in the circumferential direction of the seal member 22 so that the center of the seal member 22 is aligned (that is, the center of the annular seal member 22 is made to coincide with the axis O shown in FIG. 1). By so doing, it is possible to improve the balance of the seal member 22 to distribute stress when hydraulic pressure of the hydraulic oil OL is applied to the seal member 22. This can suppress wear of each protruding portion 42.

In addition, in each of the examples shown in FIG. 11 to FIG. 13, the protruding portion 42 is formed on a surface at the upper side of the outer periphery of the seal member 22. When gas is trapped in the oil chamber 5, because the specific gravity of gas is smaller than that of the hydraulic oil OL, the gas goes up in the hydraulic oil OL and accumulates at the upper region of the oil chamber 5 to form the space S. Thus, by forming the protruding portion 42 at the vertically upper position (typically, uppermost portion) at which air tends to accumulate, it is possible to obtain an advantageous effect that air in the oil chamber 5 is discharged through the gaps 45 to the outside of the oil chamber 5.

As described above, the sealing device according to the present embodiment seals a gap between the hollow cylinder 1 and the piston 2 that is reciprocally movable with respect to the cylinder 1. The sealing device seals the hydraulic oil L which may serve as liquid supplied to move the piston 2, in the oil chamber 5. The oil chamber 5 is defined by partitioning the inner space of the cylinder 1 by the piston 2 and is surrounded by the cylinder 1 and the piston 2.

The sealing device includes the seal members 20 and 22. The seal members 20 and 22 are attached to the piston 2. The seal members 20 and 22 are in contact with the cylinder 1 and slide relative to the cylinder 1. The seal members 20 and 22 each have the base portion 41 and the protruding portion 42. The protruding portion 42 protrudes from the base portion 41 toward the cylinder 1 to separate the cylinder 1 from the base portion 41. After the hydraulic oil OL is supplied into the oil chamber 5 to fill the oil chamber 5 with the hydraulic oil OL, the protruding portion 42 elastically deforms to bring the base portion 41 into close contact with the cylinder 1.

By so doing, even when air bubbles AB are trapped in the oil chamber 5 and then the space S is formed, gas comes out of the oil chamber 5 through the gaps 45 formed by the protruding portion 42 between the cylinder 1 and the base portion 41 while the hydraulic oil OL is supplied into the oil chamber 5. Thus, when the oil chamber 5 is filled with the hydraulic oil OL, it is possible to maintain a state where no gas is trapped in the oil chamber 5. In addition, after the oil chamber 5 is filled with the hydraulic oil OL, the base portion 41 is in close contact with the cylinder 1 to hermetically seal the oil chamber 5. Thus, it is possible to ensure the sealing performance of the oil chamber 5. As a result, it is possible to reduce gas being trapped in the oil chamber 5, and it is possible to suppress variations in the amount of gas trapped in the oil chamber 5 to thereby further uniform the amount of gas trapped in the oil chamber 5. Thus, controllability of the automatic transmission is improved to make it possible to suppress occurrence of engine racing and a shift shock.

Note that, in the foregoing description, the seal members 20 and 22 are attached to the piston 2, and the seal members 20 and 22 move together with the piston 2 to slide relative to the cylinder 1. Instead, the seal members may be attached to the cylinder. However, in terms of easy manufacturing, it appears that the configuration that the seal members are attached to the piston according to the above embodiment is more advantageous.

In addition, in the foregoing description, the sealing device seals gaps between the hollow cylinder 1 and the piston 2 that reciprocally moves in the cylinder 1 to seal the hydraulic oil OL in the oil chamber 5; however, the aspect of the invention is not limited to this configuration. As long as a sealing device seals a gap between a first member and a second member that is reciprocally movable with respect to the first member, any sealing devices are applicable.

The embodiment of the invention is described above; however, the embodiment described above is illustrative and not restrictive in all respects. The scope of the invention is defined by the appended claims rather than the above description. The scope of the invention is intended to encompass all modifications within the scope of the appended claims and equivalents thereof.

The sealing device according to the aspect of the invention may be applied to a bonded piston seal that a rubber seal lip integrated with a metal member, formed into the shape of a piston, by baking bonding, or the like. The bonded piston seal is mainly used when a vehicle automatic transmission shift gears.

What is claimed is:

1. A sealing device that hermetically seals a gap to seal liquid supplied into a pressurizing chamber, the sealing device comprising:
   a first member and a second member that is reciprocally movable with respect to the first member, the first and second members defining a gap there between and surrounding the pressurizing chamber, the first and second members each having an annular shape and arranged coaxially relative to each other; and
   a sliding portion attached to the second member and slidable relative to the first member while in contact with the first member, the sliding portion including a base portion and a plurality of protruding portions that protrude from the base portion toward the first member to separate the first member from the base portion and that elastically deform to bring the base portion into close contact with the first member after the liquid is supplied into the pressurizing chamber to fill the pressurizing chamber with the liquid, the sliding portion being disposed between the first and second members, the plurality of protruding portions being formed so that, when the second member is rotated by a predetermined angle less than 360 degrees, the arrangements of the protruding portions before and after the rotation coincide with each other, wherein
   the protruding portions include at least two protrusions arranged at an interval of P, the interval P is less than the distance between the plurality of protruding portions.

2. The sealing device according to claim 1, wherein
   the first member is a hollow cylinder,
   the second member is a piston that reciprocally moves in the cylinder,
   the pressurizing chamber comprising an oil chamber formed through partitioning an internal space of the cylinder by the piston,
   hydraulic oil supplied into the oil chamber for moving the piston, and
   the sealing device hermetically seals the gap between the cylinder and the piston to seal the hydraulic oil in the oil chamber.

3. The sealing device according to claim 1, wherein the plurality of protruding portions protrude from the base portion with a protrusion height of 0.2 mm in a state where no external force acts on the protruding portion.

4. The sealing device according to claim 1, wherein the sliding portion has an annular shape, and the plurality of protruding portions are formed at equiangular positions in a circumferential direction of the sliding portion.

5. The sealing device according to claim 4, wherein at least one of the plurality of protruding portions are formed at a position at a vertically upper side of the sealing device.

6. The sealing device according to claim 1, wherein the sliding portion has an annular shape, and the plurality of protrusions are aligned in a circumferential direction of the sliding portion.

7. The sealing device according to claim 6, wherein the plurality of protrusions are formed so as to have a rectangular shape when viewed in a direction perpendicular to an axis of the sliding portion.

8. The sealing device according to claim 7, wherein the plurality of protrusions each include a top portion having a predetermined area and a rectangular shape.

9. The sealing device according to claim 6, wherein the width of each of the plurality of protrusions in the circumferential direction of the sliding portion is equal to an interval between the plurality of protrusions.

* * * * *

UNITED STATES PATENT AND TRADEMARK OFFICE
Certificate

Patent No. 8,342,536 B2                                                                    Patented: January 1, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hirofumi Morishita, Seto (JP); Tetsuya Kohno, Okazaki (JP); Masanori Kameoka, Itano (JP); and Tomohiro Usami, Itano (JP).

Signed and Sealed this Twentieth Day of August 2013.

<div style="text-align:right">
DAVID J. BAGNELL<br>
<i>Supervisory Patent Examiner</i><br>
Art Unit 3674<br>
Technology Center 3600
</div>